(12) United States Patent
Sun et al.

(10) Patent No.: US 10,511,594 B2
(45) Date of Patent: Dec. 17, 2019

(54) VERIFICATION INFORMATION PROCESSING METHOD AND DEVICE

(71) Applicant: Alibaba Group Holding Limited, George Town (KY)

(72) Inventors: Chen Sun, Beijing (CN); Gang Cheng, Beijing (CN); Lisha Qiao, Beijing (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 16/002,770

(22) Filed: Jun. 7, 2018

(65) Prior Publication Data

US 2019/0068584 A1    Feb. 28, 2019

Related U.S. Application Data

(63) Continuation-in-part of application No. PCT/CN2016/107599, filed on Nov. 29, 2016.

(30) Foreign Application Priority Data

Dec. 9, 2015   (CN) .......................... 2015 1 0907167

(51) Int. Cl.
*H04L 29/06* (2006.01)
*H04W 4/12* (2009.01)
(Continued)

(52) U.S. Cl.
CPC .... *H04L 63/0846* (2013.01); *H04M 1/72552* (2013.01); *H04W 4/12* (2013.01);
(Continued)

(58) Field of Classification Search
CPC ..... H04L 29/06; H04L 63/0846; H04L 9/006; H04L 63/0823; H04L 9/0844; H04L 9/32; H04L 9/3242; H04L 9/3228; H04L 63/123; H04L 9/3213; H04L 9/3226; H04L 29/12518; H04L 29/06748; H04L 29/06755; H04L 29/06761; H04W 4/20; H04W 4/12; H04W 12/00; H04W 12/06;
(Continued)

(56) References Cited

U.S. PATENT DOCUMENTS

| 7,421,474 B2 | 9/2008 | Motoyama |
| 2004/0133678 A1* | 7/2004 | Tamura .......................... 709/225 |

(Continued)

FOREIGN PATENT DOCUMENTS

| CN | 103902740 A | 7/2014 |
| CN | 104935744 A | 9/2015 |

(Continued)

*Primary Examiner* — Meless N Zewdu
(74) *Attorney, Agent, or Firm* — Van Pelt, Yi & James, LLP

(57) ABSTRACT

Extracting and processing verification information is disclosed, including: receiving a message at a device; extracting verification information for authenticating a user of an application from the message; presenting the verification information at a verification information input interface at the device; and performing authentication of the user locally at the device using the verification information sending the verification information via the verification information input interface to an authentication server associated with the application to authenticate the user.

18 Claims, 10 Drawing Sheets

(51) Int. Cl.
*H04W 4/20* (2018.01)
*H04M 1/725* (2006.01)

(52) U.S. Cl.
CPC .......... *H04W 4/20* (2013.01); *H04M 1/72561* (2013.01); *H04M 1/72597* (2013.01)

(58) Field of Classification Search
CPC ..... H04W 12/0602; H04W 4/60; H04W 4/50; H04W 8/04; H04W 8/18; H04W 12/0023; H04W 4/002; H04W 4/0027; H04W 12/00409; H04W 12/0608; H04W 80/12; H04W 4/203; H04W 4/21; H04W 12/0027; H04W 12/002; H04W 12/001; H04W 12/0609; H04W 12/10; H04W 12/005; H04W 12/00503; H04W 12/08; H04W 12/12; H04M 1/72597; H04M 1/725; H04M 1/72561; H04M 1/72552; G06Q 20/12; G06Q 20/40; G06Q 30/00; G06Q 30/0601; G06Q 20/3674; G06Q 30/0641

See application file for complete search history.

(56) References Cited

U.S. PATENT DOCUMENTS

| | | |
|---|---|---|
| 2006/0265243 A1 | 11/2006 | Racho |
| 2011/0078025 A1* | 3/2011 | Shrivastav ................. 705/14.64 |
| 2013/0139239 A1 | 5/2013 | Jillings |
| 2014/0289644 A1* | 9/2014 | Clarke et al. ..... H04M 1/72547 |
| 2014/0376042 A1* | 12/2014 | Kawabata et al. ........................... H04N 1/00392 |
| 2016/0366127 A1* | 12/2016 | Tanoni ................ H04L 63/0853 |
| 2017/0199941 A1 | 7/2017 | Geng |
| 2017/0310685 A1 | 10/2017 | Zhao |
| 2019/0097812 A1* | 3/2019 | Toth ...................... H04L 9/3247 |

FOREIGN PATENT DOCUMENTS

| | | |
|---|---|---|
| CN | 105101122 A | 11/2015 |
| CN | 103546877 B | 10/2018 |

* cited by examiner

1 October 30, 8:28 PM

[Ding Ding] Verification Code: 4427, valid for immediate login if input within 15 minutes         ⌐402

← Enter verification code

| 4 | 4 | 2 | 7 | → 702

Obtain New Verification Code (15)

Next Step

| + | 1 | 2 | 3 | ⌫ |
| − / , | 4 | 5 | 6 | * |
| | 7 | 8 | 9 | # |
| &# | . | 0 | ␣ | ↵ |

FIG. 7

VERIFICATION INFORMATION PROCESSING METHOD AND DEVICE

CROSS REFERENCE TO OTHER APPLICATIONS

This application is a continuation-in-part of and claims priority to International (PCT) Application No. PCT/CN16/107599 entitled A METHOD AND MEANS FOR PROCESSING VERIFICATION INFORMATION, filed Nov. 29, 2016 which is incorporated herein by reference for all purposes, which claims priority to People's Republic of China Patent Application No. 201510907167.0 entitled A METHOD AND MEANS FOR PROCESSING VERIFICATION INFORMATION, filed Dec. 9, 2015 which is incorporated herein by reference for all purposes.

FIELD OF THE INVENTION

The present application relates to a field of authenticating a user. In particular, it relates to authenticating a user for an application.

BACKGROUND OF THE INVENTION

In some instances, when a user performs an operation such as logging into an application server, the user may need to undergo identity verification. Under such circumstances, the application server will send a verification code (e.g., a four- to six-digit number or other characters) based on the user terminal ID to the user terminal (e.g., a mobile phone) bound to the user's account number. The user can then complete identity verification by entering the verification code through a verification code input box that is displayed at an application interface.

For example, a user logs onto a shopping application at his mobile device. After the user's mobile device receives a text message containing a verification code for the purpose of completing identity verification, the user opens the text messaging application in order to view the text message and memorizes the verification code that is included in the displayed text message. Next, the user switches back to the shopping application, calls up the input verification interface of the shopping application and then manually enters the memorized verification code into the verification code input box of the input method interface. The user then selects a control to cause the mobile device to send the verification code to the server and the server will complete the user identity verification processing using the verification code.

In the above example, the user needs to open a text messaging application and manually memorize the verification code that is included in the displayed text message. As a result, the identity verification process is relatively cumbersome and inefficient.

SUMMARY OF THE INVENTION

An embodiment of the present application provides a verification information-processing method to solve a problem in the prior art, namely the relatively bothersome process of identity verification that results from users having to remember verification codes in text messages.

An embodiment of the present application further provides a verification information-processing means to solve a problem in the prior art, namely the relatively bothersome process of identity verification that results from users having to remember verification codes in text messages.

The following technical schemes described below are in accordance with some embodiments:

A method for processing verification information comprises:
acquiring verification information contained in a received message; and displaying the verification information in an input method interface.

A system for processing verification information comprises:
a verification information acquiring unit, for acquiring verification information contained in a received message; and a verification information displaying unit, for displaying the verification information in an input method interface.

A system for processing verification information comprises:
memory, for storing program instructions; and a processor, coupled to the memory, for reading the program instructions stored by the memory and, in response, executing the following operations: acquiring verification information contained in a received message; and displaying the verification information in an input method interface.

An embodiment of the present application can achieve the following beneficial results by employing at least one of the technical schemes described below:

By employing the method and system for processing verification information provided by an embodiment of the present application, it is possible to automatically extract verification information from a message that includes the verification information and to display the verification information in an input method interface without requiring the user to memorize the verification information. The process whereby users undergo identity verification is thus simplified.

BRIEF DESCRIPTION OF THE DRAWINGS

Various embodiments of the invention are disclosed in the following detailed description and the accompanying drawings.

The drawings described here are intended to further the understanding of the present application and form a part of the present application. The illustrative embodiments of the present application and the descriptions thereof are intended to explain the present application and do not constitute inappropriate limitation of the present application. Among the drawings:

FIG. 4 shows an example message that is received at a device.

FIG. 7 shows an example verification information input interface in which the extracted verification information is displayed inside the verification information input field.

DETAILED DESCRIPTION

Figure 1:
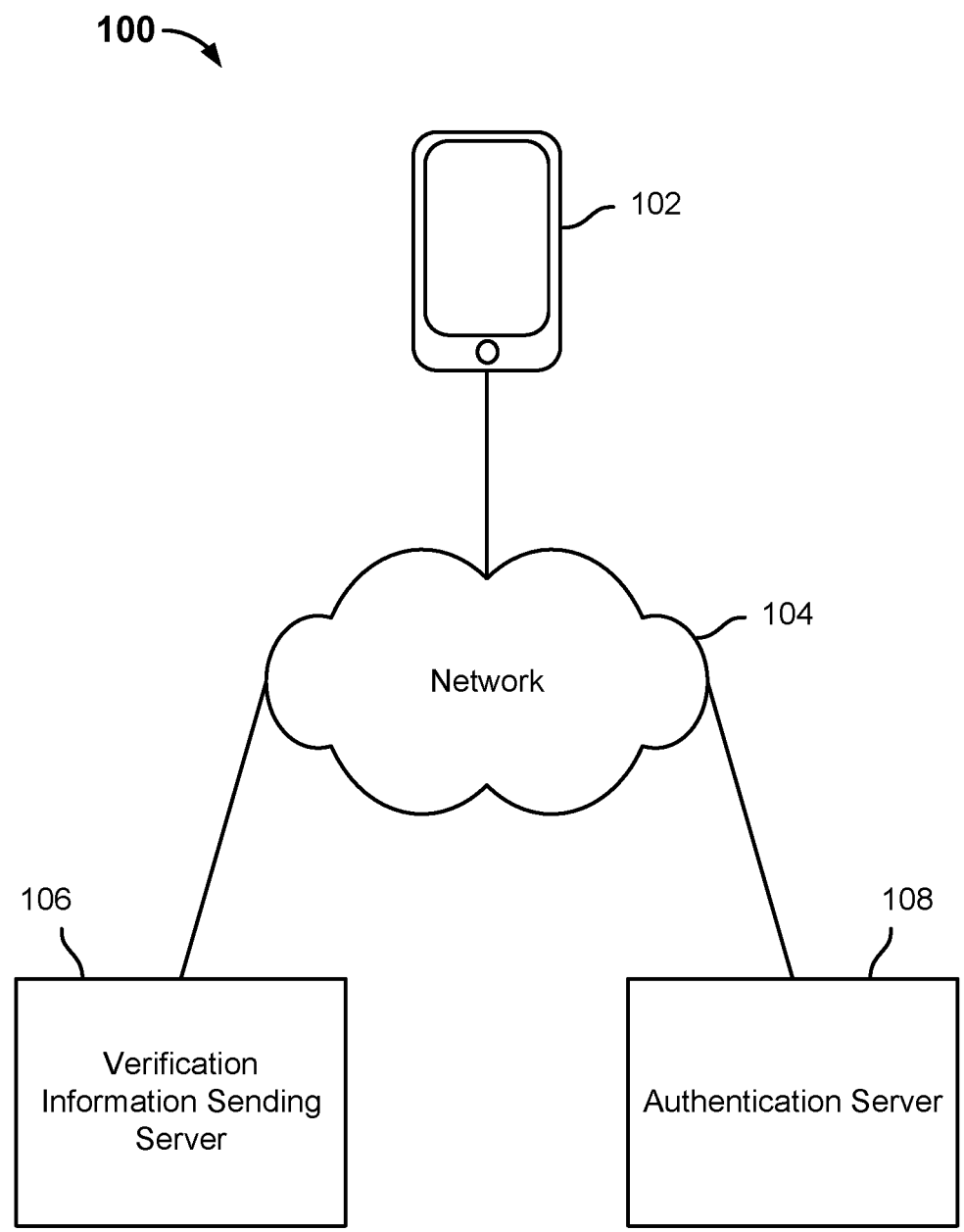
FIG. 1 is shows a diagram of a system for extracting and processing application verification information.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

To further clarify the objectives, technical schemes, and advantages of the present application, technical schemes of the present application are described clearly and completely below in light of specific embodiments and corresponding drawings of the present application. The embodiments described are only some of the embodiments of the present application and are not all the embodiments. All other embodiments obtained on the basis of the embodiments of the present application by persons with ordinary skill in the art shall fall within the scope of protection of the present application so long as no inventive effort is made in the course of obtaining them.

Embodiments of extracting and processing application verification information are described herein. Verification information to authenticate a user to an application is extracted from a message received at a device. The verification information is presented at a verification information input interface at the device. The verification information is sent via the verification information input interface to an authentication server associated with the application or authenticated locally at the device.

FIG. 1 is shows a diagram of a system for extracting and processing application verification information. In the example, system 100 includes device 102, network 104, verification information sending server 106, and authentication server 108.

Device 102 is configured to receive, from verification information sending server 106, a message that includes verification information. For example, device 102 may comprise a mobile device, a smart device, a tablet, a laptop computer, a desktop computer, a phone, and/or any other computing device. In various embodiments, verification information comprises a series of alphanumeric characters. In various embodiments, the message comprises a text message (e.g., a Short Message Service (SMS) message) or a message associated with a messaging application. In various embodiments, device 102 is configured to receive the verification information in response to a user submitting a request to log in and/or authenticate to an application that is executing at device 102. For example, the user submits the request to log in and/or authenticate to the application by submitting his or her user credentials (e.g., user name and password) over a sign-in page of the application. The user credentials may be sent to authentication server 108, which then sends an instruction to verification information sending server 106 to send verification information to device 102 to enable the user to complete the verification process that is required to successfully sign-in to and use the application. In some embodiments, authentication server 108 and verification information sending server 106 are the same server.

As will be described in further detail below, in response to receiving the message with the verification information, software (e.g., an operating system or an application) executing at device 102 is configured to automatically extract the verification information from the message and present it at a verification information input interface that is presented at device 102. Furthermore, the presented verification information is sent to authentication server 108 for authentication server 108 to verify such information. In various embodiments, authentication server 108 is configured to verify the verification information received from device 102 by comparing it against the original verification information that was sent to device 102 by verification information sending server 106. In the event that authentication server 108 determines that the verification information received from device 102 is the same as the original verification information that was sent to device 102 by verification information sending server 106, authentication server 108 determines that the user of device 102 has been authenticated and issues an instruction to the application executing at device 102 to allow the user to sign-in and access the services of the application. In some embodiments, the extracted verification information is authenticated locally at device 102.

By automatically extracting verification information that is sent to a user's device and facilitating returning such information to the appropriate authentication server, the user is spared having to manually memorize and input the verification information into an input field. Furthermore, the rate at which incorrect verification information is sent over a network and received at the authentication server is also reduced.

Figure 2:
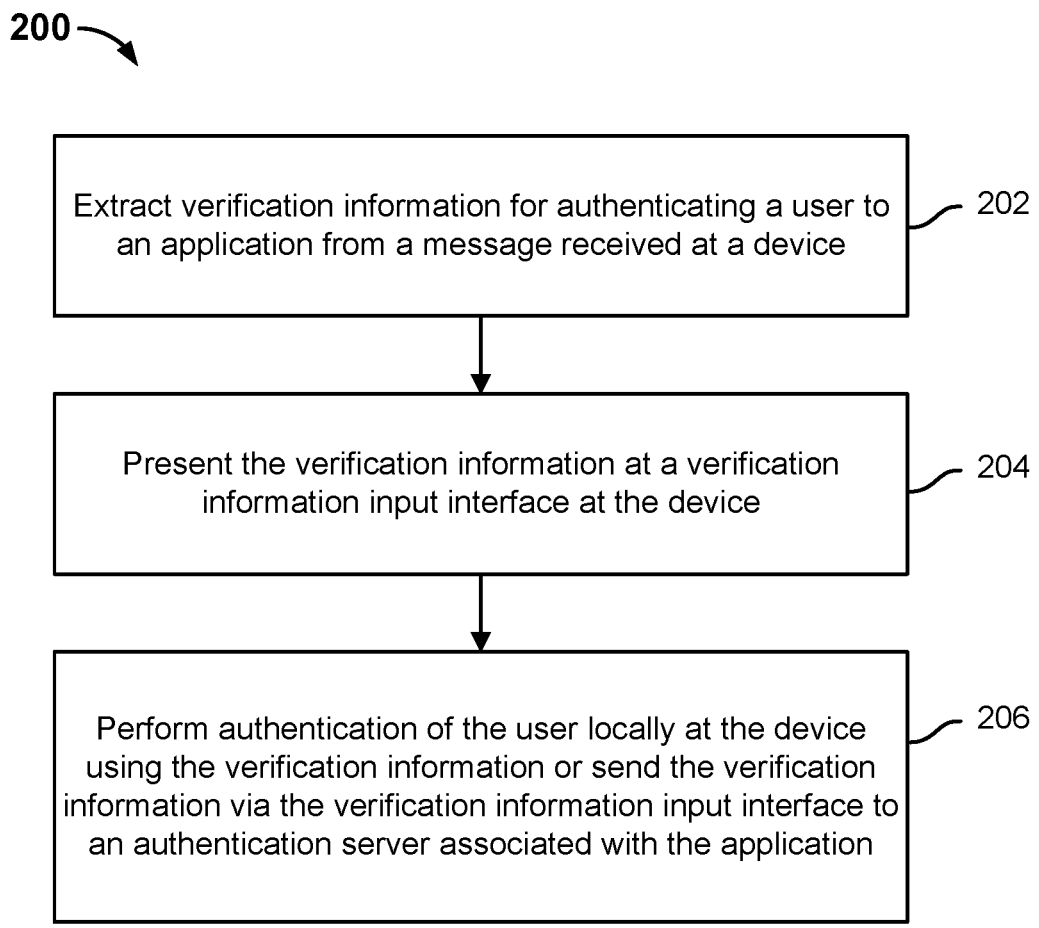
FIG. 2 shows a flow diagram describing an embodiment of a process for extracting and processing application verification information.

FIG. 2 shows a flow diagram describing an embodiment of a process for extracting and processing application verification information. In some embodiments, process 200 is implemented at device 102 of system 100 of FIG. 1. In various embodiments, process 200 is implemented by software executing at device 102 of system 100 of FIG. 1. For example, process 200 is implemented by at least one of an application and an operating system executing at device 102 of system 100 of FIG. 1.

At 201, a message is received at a device.

At 202, verification information for authenticating a user of an application is extracted from the message.

In some embodiments, the received message is a text message that is received by a text messaging application executing at the device. In some embodiments, the received message is an instant messaging message that is received by a chat/messaging application executing at the device. The message includes verification information. For example, the verification information comprises a four or six digit number. For example, through an application interface (e.g., a text to string conversion and/or string extraction application programming interface (API)) open to the device's operating system, the operating system could acquire verification information that is included in the message received by the application.

In some embodiments, the message including the verification information is received at the device in response to a user submitting credentials during a sign-in process at an application. For example, the user opens the application at the device and inputs his or her username and password at a sign-in page of the application. The credentials may be transmitted to a server associated with the application and the recipient server may be configured to either directly send the message to the device or cause another server to send the message to the device.

The purpose of the verification information is to subject the user to identity verification to authenticate the user.

In a first example, the verification information that is extracted from a message is a verification code for ensuring information security. For example, a user's account numbers associated with a shopping application are often bound to corresponding user phone numbers and payment application accounts (such as bank or third party payment platforms, for example). Thus, to ensure the security of a user's electronic account when the user uses the account number for shopping, the server for the payment application often may push a text message containing verification information (e.g., a four-digit number) to the user's mobile device. By using the device to send back the correct verification information to the server for the payment application, the user is authenticated by the application server and therefore permitted to use the application.

In a second example, the verification information that is extracted from a message is content that is displayed in a Completely Automated Public Turing Test to Tell Computers and Humans Apart (CAPTCHA).

In various embodiments, the verification information may comprise one or more of the following: numbers, letters, and text.

Generally, a message that includes verification information that is received by a device includes content other than the verification information. For example, examples of such content may include information associated with a message sender or provider and/or time information relating to the expiration of the verification information that is included in the message.

Some messages that include verification information have set formats. For example, verification information messages sent by Server A for Application 1 (the server generally sends text messages via base stations in a mobile communication network) have the format of "[Server A] verification code: 1234." Verification information messages sent by Server B for Application 2 have the format of "[Server B] verification information 1234." Verification information messages sent by Server C for Application 3 have the format of "[Server C] verification code: 1234, valid for 15 minutes." Thus, the verification code can be extracted from the messages by parsing the message and identifying the relevant field.

Figure 3:
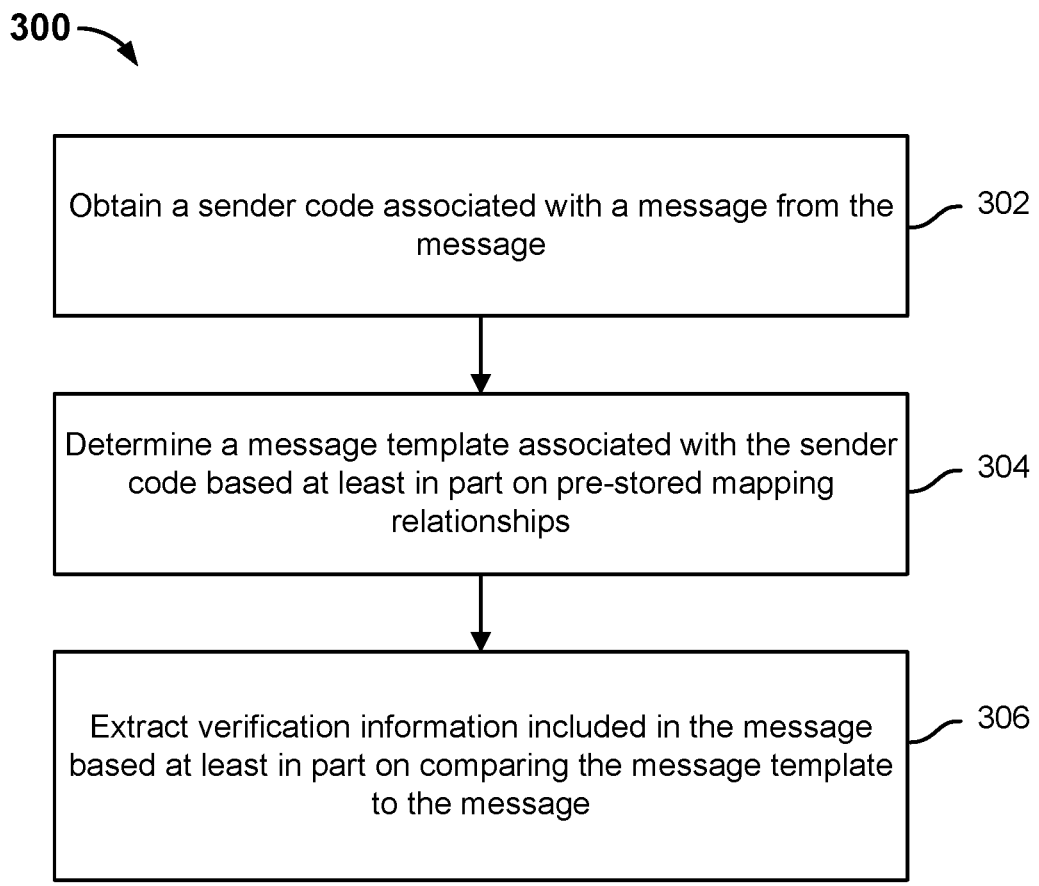
FIG. 3 shows a flow diagram describing a first example process for extracting verification information from a message.
Figure 5:
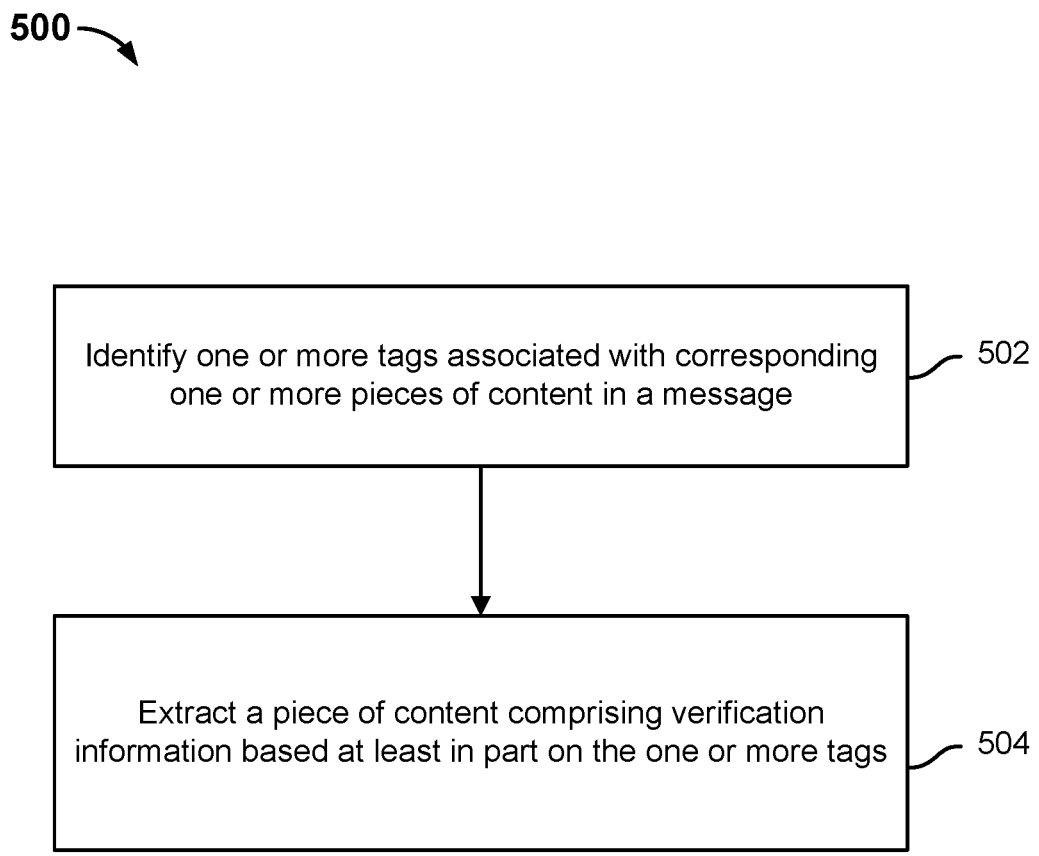
FIG. 5 shows a flow diagram describing a second example process for extracting verification information from a message.

FIGS. 3 and 5, below, respectively describe two different examples of processes of extracting verification information from a message. FIGS. 3 and 5 merely represent two example techniques of extracting verification information from a message and other extraction techniques may be used as well.

Returning to FIG. 2, at 204, the verification information is presented at a verification information input interface at the device.

Figure 6:
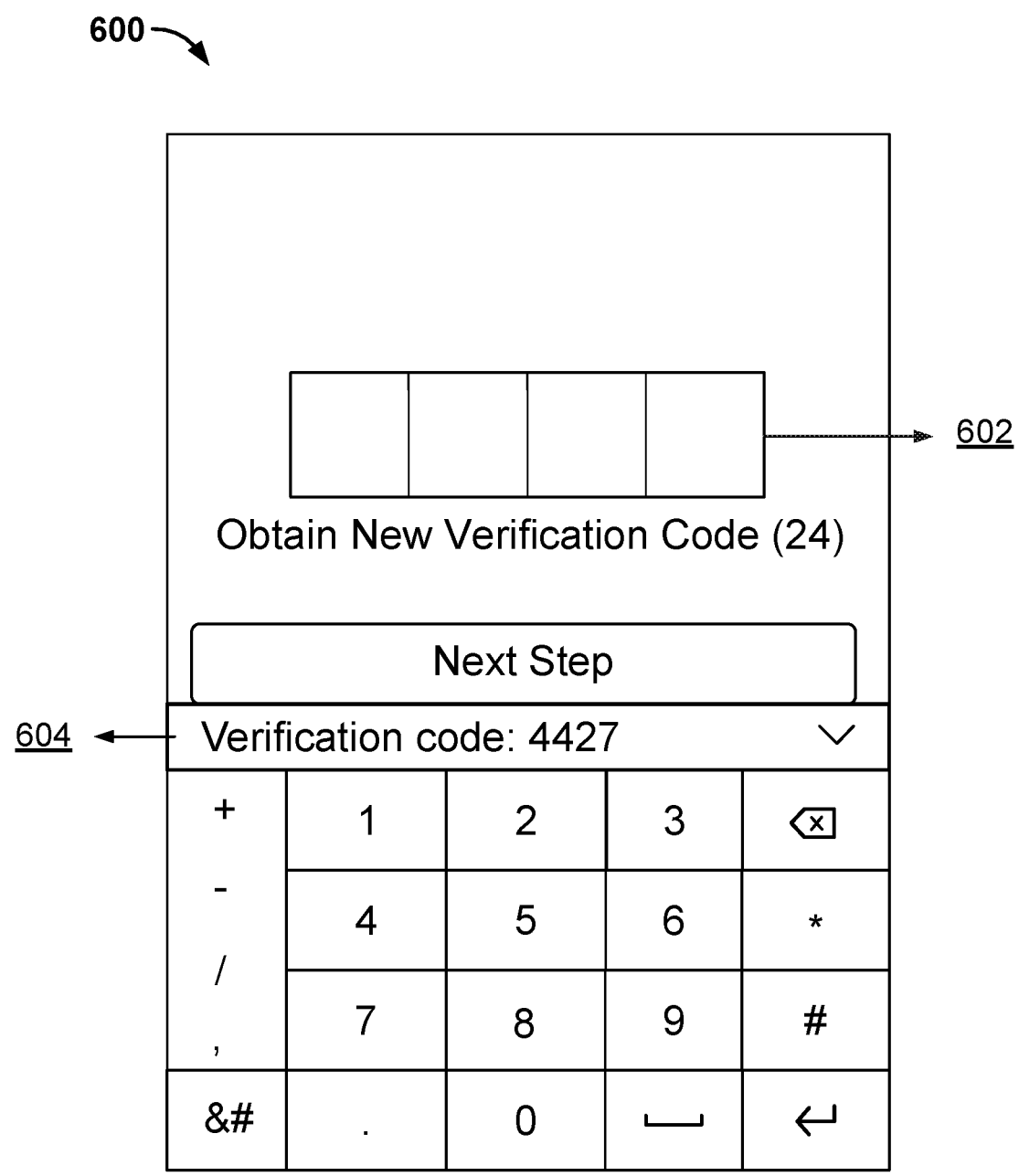
FIG. 6 shows an example verification information input interface in which the extracted verification information is displayed in a candidate verification code display zone.

In various embodiments, the extracted verification information is displayed at a verification information input interface that is presented at the device. FIG. 6 shows an example verification information input interface in which the extracted verification information is displayed in a candidate verification code display zone. In the example of FIG. 6, the extracted verification information ("4427") was extracted from the example message that is shown in FIG. 4, which is described further below. By displaying the extracted verification information at candidate verification code display zone 604 of verification information input interface 600, the user of the device is automatically shown the verification information that was automatically extracted from a received message. The user no longer needs to memorize the verification information from the message and instead can just manually input the verification information that is suggested and displayed in candidate verification code display zone 604 directly into verification information input field 602 that is located in the same interface.

In various embodiments, if the application for which the received verification information is to be used for authentication is not currently open (e.g., because the user has opened another application at the device), the operating system at the device can record the extracted verification information, switch from the device's currently displayed application to the verification information input interface of the application corresponding to the verification information, and then display the recorded extracted verification information in a designated zone of the verification information input interface.

In some embodiments, the extracted verification information is automatically (e.g., without the user manually entering the characters of the extracted verification information) imported/populated into the verification information input field of the verification information input interface. FIG. 7 shows an example verification information input interface in which the extracted verification information is displayed inside the verification information input field. As shown in FIG. 7, the extracted verification information "4427" (that was extracted from the example message shown in FIG. 4) is automatically used to populate verification information input field 702 of verification information input interface 700. For example, extracted verification information "4427" was populated into verification information input field 702 of verification information input interface 700 in response to a user selecting (e.g., touching the touchscreen of the device) the region of the screen of the device at which the extracted verification information was displayed in a candidate verification code display zone (e.g., candidate verification code display zone 604 of verification information input interface 600 of FIG. 6).

At 206, authentication of the user is performed locally at the device using the verification information or the verification information is sent via the verification information input interface to an authentication server associated with the application to authenticate the user.

In some embodiments, the extracted verification information is not sent to an authentication server that is associated with performing authentication on users that are signing into the application and instead authenticated locally at the device. For example, the operating system executing at the device may compare the extracted verification information against pre-stored verification information.

In some embodiments, the extracted verification information is sent to an authentication server that is associated with performing authentication on users that are signing into the application. In various embodiments, the authentication server that is associated with performing authentication on users that are signing into the application is also the server that provides services associated with the application. In some embodiments, after displaying the extracted verification information at a verification information input interface, the extracted verification information is automatically sent to the authentication server, without requiring any user action. In some embodiments, after displaying the extracted verification information at a verification information input interface, a user operation (e.g., a user selection of a control such as the "Next Step" button as shown at verification information input interface 700 of FIG. 7) is first received at the device before the extracted verification information is sent to the authentication server. In some embodiments, the authentication server is configured to compare the received verification information with the verification information that was sent to the device in the message. If the received verification information matches that which was sent in the message, the authentication server will confirm that the user is authenticated and send instructions to permit the user to sign into the services associated with the application. For example, once the user is authenticated, the server associated with the application is configured to send content associated with the application to the device and/or send instructions to the device to permit the user to access content associated with the application that is already stored at the device. Otherwise, if the received verification information does not match that which was sent in the message, the authentication server will indicate that the user is not authenticated and send instructions to deny the user access to the services associated with the application. In some embodiments, the application executing at the device is able to locally verify the user based on the extracted verification information, without sending the verification information to a remote server.

If the server that sends the message that includes the verification information is the same server that provides services associated with the application to which the user is signing in, there is a correspondence between the verification information and the application. In some embodiments, such a correspondence is referred to as a "clear-cut correspondence" between the server that sends the verification information message and the server associated with the application.

If the server that sends the message that includes the verification information is a different server than the server that provides services associated with the application to which the user is signing in, there is a specific relationship between the two servers. In some embodiments, such a correspondence is referred to as an "ordinary correspondence" between the server that sends the verification information message and the server associated with the application.

The following are examples describing clear-cut correspondence scenarios. Assume that the server of a chat application is referred to as Server A and the server of a shopping application is referred to as Server B. Thus, when the sender server of the message that includes the verification message is Server A and the application corresponding to the verification information included in the message is a chat application, the correspondence between the verification information and the application is "clear cut" because the same server provides the verification information and services associated with the chat application. When the sender server of the message that includes the verification message is Server B, then the application corresponding to the verification information included in the message that includes the verification message is a shopping application, the correspondence between the verification information and the application is "clear cut" because the same server provides the verification information and services associated with the shopping application.

The following are examples describing ordinary correspondence scenarios. Assume that the server of a chat application is referred to as Server A, the server of a shopping application is referred to as Server B, and the server that sends the verification information is referred to as Server C. Also, assume that the verification information messages sent by Server C may be verified by Server A and/or Server B. Thus, the verification information sent by Server C corresponds separately with each of the two apps that are respectively provided by Server A and Server B, and as such, the correspondence between the verification information and the applications are "ordinary" because different servers provide the verification information and services associated with the application.

Whether there is a clear-cut correspondence or an ordinary correspondence between the servers associated with sending the verification information message and for performing authentication for an application, in some embodiments, one or more attributes of a message that is received at the device are determined and compared against preset mapping relationships between message attributes and corresponding servers, to determine the server corresponding to the application and also to determine the server that had sent the verification information contained in the message. For example, such attribute(s) of the message may include but are not limited to the sender code (e.g., a telephone number or a chat account number) and/or an application name.

FIG. 3 shows a flow diagram describing a first example process for extracting verification information from a message. In some embodiments, process 300 is implemented at device 102 of system 100 of FIG. 1. In various embodiments, process 300 is implemented by software executing at device 102 of system 100 of FIG. 1. For example, process 300 is implemented by either an application or an operating system executing at device 102 of system 100 of FIG. 1. In some embodiments, step 202 of process 200 of FIG. 2 is implemented at least in part using process 300.

At 302, a sender code associated with a message is obtained from the message. In some embodiments, a sender code associated with the message comprises a telephone number, a number associated with a messaging account, or some other identifying information associated with a server that had sent the verification information. The sender code associated with a message may be obtained from within the text of the message and/or with the received metadata associated with the message.

At 304, a message template associated with the sender code is determined based at least in part on pre-stored mapping relationships. The device stores mapping relationships between various sender codes and corresponding message formats. A message template is a file that identifies where certain types of information are located within a message. In various embodiments, a message template describes the relative location of certain types of information within a message, including, for example, where the verification information of a message is located relative to other types of information and/or relative to fixed text that is included in the message.

At 306, verification information included in the message is extracted based at least in part on comparing the message template to the message. The message template is compared to the message to identify the location (e.g., field) in which the verification information is stored and the identified verification information is then extracted.

FIG. 4 shows an example message that is received at a device. A sender code associated with message 402 is "Ding Ding," which is shown in square brackets inside the message, from which message 402 was received. A stored message template associated with the sender "Ding Ding" is obtained. The obtained message template indicates that the underlined text (4427, in this case) is the verification information and that "15 minutes," which is separated from the underlined text by the text "valid for immediate login if input within," is the window of time since receipt of the message in which the verification information is valid (before it expires).

For example, an operating system of a device may pre-store the mapping relationships between the different formats of text messages and the sender codes for text messages. Assuming that these mapping relationships have been saved, the operating system can, upon receiving a text message, use the text message sender code and these mapping relationships as a basis to determine the format that is mapped to the text message and then extract the desired information from the message using the appropriate mapping.

FIG. 5 shows a flow diagram describing a second example process for extracting verification information from a message. In some embodiments, process 500 is implemented at device 102 of system 100 of FIG. 1. In various embodiments, process 500 is implemented by software executing at device 102 of system 100 of FIG. 1. For example, process 500 is implemented by either an application or an operating system executing at device 102 of system 100 of FIG. 1. In some embodiments, step 202 of process 200 of FIG. 2 is implemented at least in part using process 500.

At 502, one or more tags associated with corresponding one or more pieces of content are identified in a message. For example, different portions of a received message may be associated with different tags that describe the types of information that are included in those portions.

At 504, a piece of content comprising verification information is extracted based at least in part on the one or more tags. The portion of the message that is associated with the verification information tag is extracted. The other tagged portions of the message may be extracted accordingly.

For example, a text message that is received by a text messaging application on a user's device is: "[SinaTech] Verification Code: 1234, valid for 15 minutes," where "[SinaTech]" is associated with the "sender tag," "1234" is associated with the "verification number tag," and "15 minutes" is associated with the "time tag." The device operating system thus analyzes the text message based on the pre-saved "sender tag," "verification information tag," and "time tag" and acquires the text message sender information "[SinaTech]," verification information "1234," and time information "15 minutes."

In some embodiments, if no user operation is received within a set length of time after the extracted verification information is displayed at the verification information input interface, then the verification information is no longer displayed at that interface. For example, the set length of time is 10 seconds. In this example, if no user operation (e.g., a user selection of the presented verification information or a user input of text into the verification information input field) is received by the device within 10 seconds after the verification information is presented in the verification information input interface, the verification information is no longer presented at the verification information input interface.

In some embodiments, to provide the user of the device more context with the extracted verification information (e.g., so that the user can be informed of the application to which the verification information corresponds and/or whether the verification information is still valid), additional information may be presented with the extracted verification information at the verification information input interface. The following are two example pieces of information that may be displayed with the extracted verification information at the verification information input interface:

Information 1: Expiration time information associated with the verification information.

In some embodiments, the received message that included the verification information also includes a time at which the verification information will expire (i.e., become invalid and therefore unable to be used to authenticate the user to the application). For example, the example message that is shown in FIG. 4 includes verification information ("4427") in addition to the length of time during which it is valid ("15 minutes") to use to authenticate the user. As such, a counter counting down from 15 minutes may be displayed at verification information input interface 600 of FIG. 6 to show for how long the extracted verification information is still valid.

In some embodiments, if the received message that included the verification information does not include a time at which the verification information will expire, then a preset default expiration time (e.g., half an hour or one hour) may be used.

Information 2: Provider information for the verification information.

In some embodiments, the provider information for the verification information is determined according to the sender of the message. For example, if the sender server of a message is Server A, then it can be determined that the provider information for the verification information contained in the message is Server A.

In some embodiments, there are scenarios in which the extracted verification information is not displayed at the verification information input interface. For example, the extracted verification information may not be displayed (e.g., in the candidate verification information display zone) if either the verification information input field of the verification information input interface is not empty or when the extracted verification information is no longer valid because it had expired. As such, to avoid displaying extracted verification information in a scenario in which it is not needed or is not available, such as in the example scenarios described above, before the extracted verification information is displayed at the verification information input interface, it is determined whether one or more conditions are met. The following are two example condition types associated with displaying the extracted verification information at the verification information input interface:

Condition Type 1: Information relating to the verification information satisfies a predetermined condition.

Information relating to the verification information may include, but is not limited to, at least one of the following two example types of information that are described below:

Verification Information Type 1: Expiration time information associated with the verification information.

The input expiration time information for the verification information may be determined according to the time when the message was received at the device and the length of time for the validity of the verification information that is included in the message. Specifically, the expiration time of the verification information is determined by adding the length of time for the validity of the verification information that is included in the message to the time at which the message was received at the device. As such, an example condition for displaying the extracted verification information is that the current time is not after the expiration time. For example, referring to the example message of FIG. 4, the length of time for the validity of the verification information is 15 minutes and the time when the message was received by the device is "October 30, 8:28 PM." If the device receives a user operation directed at the verification information at 8:30 PM on October 30, then it is determined that the verification information included in the message has not expired because the short message was received by the device only 2 minutes earlier, less than the 15 minutes when the verification information expires.

Verification Information Type 2: Provider information for the verification information.

Another example condition for displaying the extracted verification information is that the server that provided the verification information message is also the server associated with the application within which an input interface is displayed. In some embodiments, the application corresponding to the interface where the input method interface is located could be the application that calls the input interface. For example, a user activates app ABC and when the user wishes to input content into application ABC, application ABC calls an input interface to enable the user to enter content via the interface. In this situation, application ABC could be referred to as the application corresponding to the interface where the input interface is located.

Condition Type 2: The designated context information matches predetermined context information.

In some embodiments, the designated context information may include, but is not limited to, at least one of the following two types described below:

Designated Context Information Type A: Status of verification information input field.

Yet another example condition for displaying the extracted verification information is if the verification information input field (e.g., verification information input field 604 of verification information input interface 600 of FIG. 6) in the verification information input interface is empty (i.e., not populated with any characters).

Designated Context Information Type B: Keyboard type information.

One more example condition for displaying the extracted verification information is if the keyboard interface that is presented at the device is a numeric keyboard (such as the keyboard interfaces shown in the examples of FIGS. 6 and 7) or if the keyboard interface is a full alphanumeric keyboard (hereinafter referred to as the "non-numeric" keyboard interface), then the time interval in between when the message was received at the device and when the non-numeric keyboard interface is presented is in less than a preset time interval. In some embodiments, the operating system at the device is configured to monitor the status of the type of keyboard that is presented and also when the keyboard is presented.

More commonly, the verification information that is extracted from the received message is numeric. Therefore, in order to improve verification information input efficiency, in some embodiments, when the verification information input field is presented at a device, the operating system executing at the device is to instruct the application presenting the verification information input interface to switch the keyboard interface displayed to the numeric keyboard interface (if the numeric keyboard interface was not already the one displayed). In addition, when the application interface is switched, there may be differences in the functions of the application interface after it is switched. For example, some application interfaces are for supporting user input of numbers used in calculations; some application interfaces are for supporting user input of text; and some application interfaces do not support user input of characters. In accordance with these differences, the device's operating system can instruct the application at which the verification information input field is presented to present a non-numeric keyboard or not to pop up a keyboard. Therefore, when the designated context information includes keyboard type information, an example condition for displaying the extracted verification information is if the keyboard interface that is presented at the device is a numeric keyboard.

When the type of the keyboard interface that is presented at the verification information input interface is not a numeric keyboard, but the user still might hope to enter verification information, it is further determined whether to display the extracted verification information based on information capable of reflecting the user's tendency to enter verification information. Therefore, another example condition for displaying the extracted verification information is if the time interval in between when the message was received at the device and when the non-numeric keyboard interface is presented is less than a preset time interval. For example, a preset time interval is 10 seconds. For example, assume that the device does not receive a message with verification information until 10 seconds after a non-numeric keyboard is presented at the verification information input interface. At this point, the device (or an operating system thereof) cannot execute an associated operation on the verification information in the message because the non-numeric keyboard interface has been presented beyond the preset time interval before the message was received. This condition is set based on the assumption that if a numeric keyboard is not called by the user to be presented at the device beyond a preset time interval prior to the receipt of the message, then it is inferred that the user has no intention to input the verification number and so in this case, the verification information need not be displayed for the user at the verification information input interface. However, if the device receives a message within 10 seconds after the non-numeric keyboard interface is presented, then the device (or an operating system thereof) can determine that the keyboard type information satisfies a predetermined condition.

In some embodiments, a user can use not only apps to access application servers but also web browsers to access the same application servers. In such a scenario, when identity verification is underway, the provider for the information relating to the received verification information message often is the web page server accessed by the user, and the application that is currently displayed at the device is a web browser application. In such a situation, if an example condition for displaying the extracted verification information is that the verification information provider is the application in which the verification information input interface is located, then it could be determined that the information relating to the verification information does not satisfy the condition and thus it will not be possible to complete verification. To avoid such a situation, in some embodiments, the application type is taken as an auxiliary decision basis when the provider information for the verification code satisfies a predetermined condition. Specifically, if the determination based on the auxiliary decision basis is that the verification information input field displayed by the current verification information display interface is a verification information input field of a browser-type application, then it is accepted by default that the verification information's provider information satisfies the predetermined condition and that the extracted verification information is to be displayed at the verification information input interface.

In some embodiments, it is determined whether either Condition Type 1 or Condition Type 2, as described above, has been met and then the extracted verification information is presented accordingly.

In some embodiments, it is determined whether Condition Type 1 and Condition Type 2 described above form a combination of conditions and then the extracted verification information is presented depending on whether the combination of conditions is met.

The following are two example approaches of using the two conditions described above for determining whether to display the extracted verification information at a verification information input interface:

Approach 1: Determine whether the acquired designated context information matches the predetermined context information (Condition Type 2). After determining that Condition Type 2 has been met, determine whether the information relating to the message satisfies a predetermined condition (Condition Type 1). After determining that Condition Type 1 has been met, determine that the conditions for displaying the extracted verification information have been met.

Figure 8:
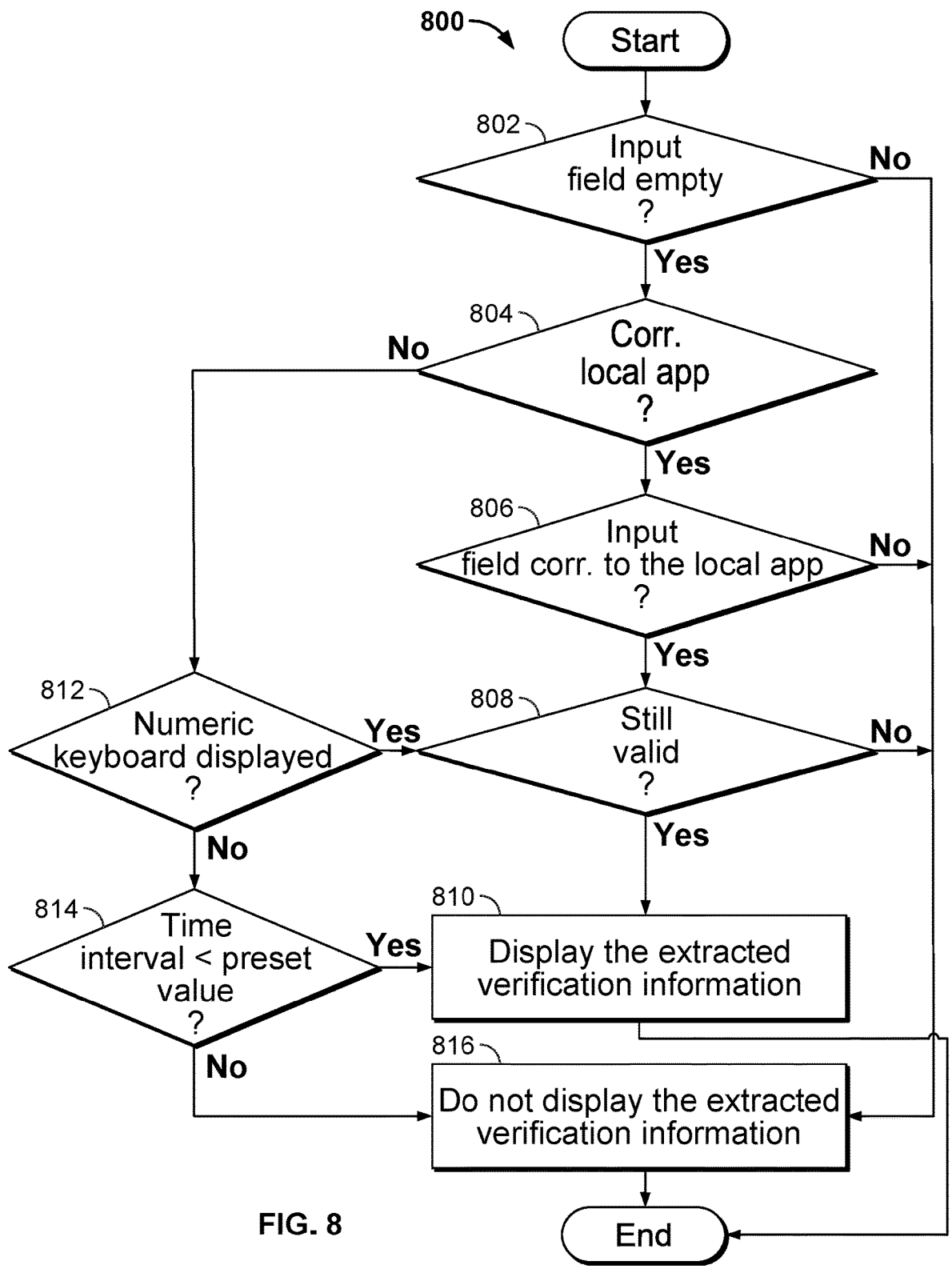
FIG. 8 is a flow diagram showing an example process of determining whether the conditions for displaying the extracted verification information have been met.

FIG. 8 is a flow diagram showing an example process of determining whether the conditions for displaying the extracted verification information have been met. In some embodiments, process 800 may be used to implement Approach 1 of determining whether the conditions for displaying the extracted verification information have been met as outlined above.

At 802, it is determined whether a verification information input field in a verification information input interface is empty. In the event that the input field is empty, control is transferred to 804. Otherwise, in the event that the input field is not empty, control is transferred to 816.

At 804, it is determined whether an application corresponding to extracted verification information is local to a device. In various embodiments, the "application corresponding to the verification information" comprises an application that is associated with the same server that provided the message with the extracted verification information. In various embodiments, an application that is "local to a device" comprises an application that is either installed at the local device and/or also executing at the local device. In the event that the application corresponding to the extracted verification information is local to the device, control is transferred to 806. Otherwise, in the event that the application corresponding to the extracted verification information is not local to the device, control is transferred to 812.

At 806, it is determined whether the verification information input field was displayed in the application corresponding to the extracted verification information. In the event that the verification information input field was displayed in the application corresponding to the extracted verification information, control is transferred to 808. Otherwise, in the event that the application corresponding to the verification information input field was not displayed in the application corresponding to the extracted verification information, control is transferred to 816.

At 808, it is determined whether the extracted verification information is still valid. The extracted verification information is still valid if it has not yet expired based on the length of time for the validity of the verification information that was included in the same message that had included the extracted verification information. In the event that the extracted verification information is still valid, control is transferred to 810. Otherwise, in the event that the extracted verification information has expired, control is transferred to 816.

At 812, it is determined whether a numeric keyboard interface is displayed. In the event that a numeric keyboard interface is not displayed, control is transferred to 814. Otherwise, in the event that a numeric keyboard interface is displayed, control is transferred to 808.

At 814, it is determined whether a time interval in between a display of a non-numeric keyboard interface and a time at which a message that had included the extracted verification message was received is less than a preset value. In the event that the time interval in between the display of a non-numeric keyboard interface and the time at which the message that had included the extracted verification message was received is less than the preset value, control is transferred to 808. Otherwise, in the event that the time interval in between the display of a non-numeric keyboard interface and the time at which the message that had included the extracted verification message was received is not less than the preset value, control is transferred to 816.

At 810, the extracted verification information is displayed at the device.

At 816, the extracted verification information is not displayed at the device.

Approach 2: Determine whether information relating to the message satisfies a predetermined condition. After determining that the information relating to the message satisfies a predetermined condition (Condition Type 1), determine whether the acquired designated context information matches predetermined context information (Condition Type 2). After determining that the acquired designated context information matches the predetermined context information (Condition Type 2), determine that the conditions for displaying the extracted verification information have been met.

The conditions described above for displaying the extracted verification information are merely examples and other conditions may be used in practice.

In the event that the message that includes the verification information is a message for which a read status is to be maintained and displayed at the device, in some embodiments, in order to prevent the user from needlessly reading the message after the verification information has been extracted from the message, the read status of the message is automatically changed from "unread" to "read," regardless of whether the user has actually opened the message. In some embodiments, the read status associated with a message is maintained by the message application through which the message was received. In some embodiments, the operating system at the device instructs the message application through which the message was received to mark the message including the verification information as "read."

By using the techniques described here, a message that includes verification information that is received at a device may be automatically processed such that its verification information is extracted and then displayed for the user of the device at a verification information input interface. As a result, the user is saved the trouble of needing to memorize the verification information from the message and the verification information can also be automatically populated into the appropriate input field of the verification information input interface such that the verification information may be sent from the device to an authentication server to simplify the user authentication. By automatically extracting the verification information from the message and also displaying the verification information at a verification information input interface, the likelihood that the incorrect verification information is sent to the authentication server is greatly reduced, which reduces the number of times that input verification information is transmitted from the device to the authentication server over a network.

Figure 9:
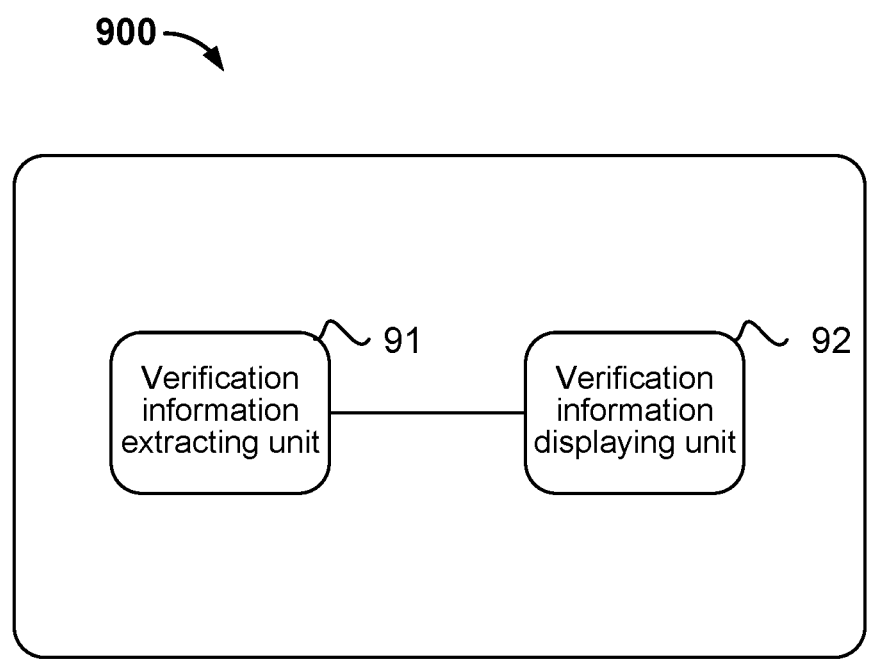
FIG. 9 is a diagram showing an embodiment of a system for extracting and processing application verification information.

FIG. 9 is a diagram showing an embodiment of a system for extracting and processing application verification information. In the example of FIG. 9, system 900 includes verification information extracting unit 91 and verification information displaying unit 92.

Verification information extracting unit 91 is configured to extract verification information included in a received message.

Verification information displaying unit 92 is configured to display the verification information in a verification information display interface.

In some embodiments, verification information displaying unit 92 is configured to display the verification information in a candidate verification code display zone in the verification information input interface.

In some embodiments, the verification information comprises a verification code (e.g., a series of numbers).

In some embodiments, verification information displaying unit 92 is configured to display at least one of the following pieces of information in the verification information input interface: expiration information associated with the verification information that is determined using content also included in the message with the verification information and the provider information for the verification information.

In some embodiments, verification information displaying unit 92 is configured to populate the verification information that is displayed at (e.g., in the candidate verification code zone of) the verification information input interface into the verification information input field of the interface in response to a received user operation at the device.

In some embodiments, verification information displaying unit 92 is configured to display the extracted verification information at the verification information input interface after determining that one or more display conditions have been met.

In some embodiments, conditions for displaying the extracted verification information are determined based at least in part on at least one of information relating to the verification information and the acquired designated context information.

In some embodiments, information relating to the verification information comprises at least one of the following:

Expiration time information associated with the verification information and provider information associated with the verification information.

In some embodiments, the expiration time information associated with the verification information is determined according to the time when the message was received at the device and the length of time that the verification information is valid that is included in the message.

In some embodiments, the provider information associated with the verification information is determined according to the sender of the message.

In some embodiments, verification information displaying unit 92 is configured to determine that an information related to the verification information condition for displaying the extracted verification information has been met when it is determined that the extracted verification information has not yet expired and is therefore still valid.

In some embodiments, verification information displaying unit 92 is configured to determine that an information related to the verification information condition for displaying the extracted verification information has been met when it is determined that the application in which the verification information input interface is opened is the application that is associated with the server that had provided the verification information.

In some embodiments, the designated context information comprises at least one of the following: status of the input box where the focal point is located and keyboard type information.

In some embodiments, verification information displaying unit 92 is configured to determine that a designated context information condition for displaying the extracted verification information has been met when it is determined that the input field in the verification information input interface is empty.

In some embodiments, verification information displaying unit 92 is configured to determine that a designated context information condition for displaying the extracted verification information has been met when it is determined that the displayed keyboard interface comprises a numeric keyboard. In some embodiments, verification information displaying unit 92 is configured to determine that a designated context information condition for displaying the extracted verification information has been met when it is determined that the time interval in between a non-numeric keyboard being displayed and the time at which the verification information message was received at the device is less than a preset value.

In some embodiments, verification information displaying unit 92 is configured to send the verification information to the server of the application (e.g., in response to a user operation or without user intervention).

In some embodiments, verification information displaying unit 92 is configured to delete the verification information from the input field of the verification information input field at the verification input display interface in the event that no user operation is received within a set length of time since the input field was populated with the extracted information.

The units described above can be implemented as software components executing on one or more processors, or as hardware components such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The units may be implemented on a single device or distributed across multiple devices. The functions of the units may be merged into one another or further split into multiple sub-units.

Figure 10:
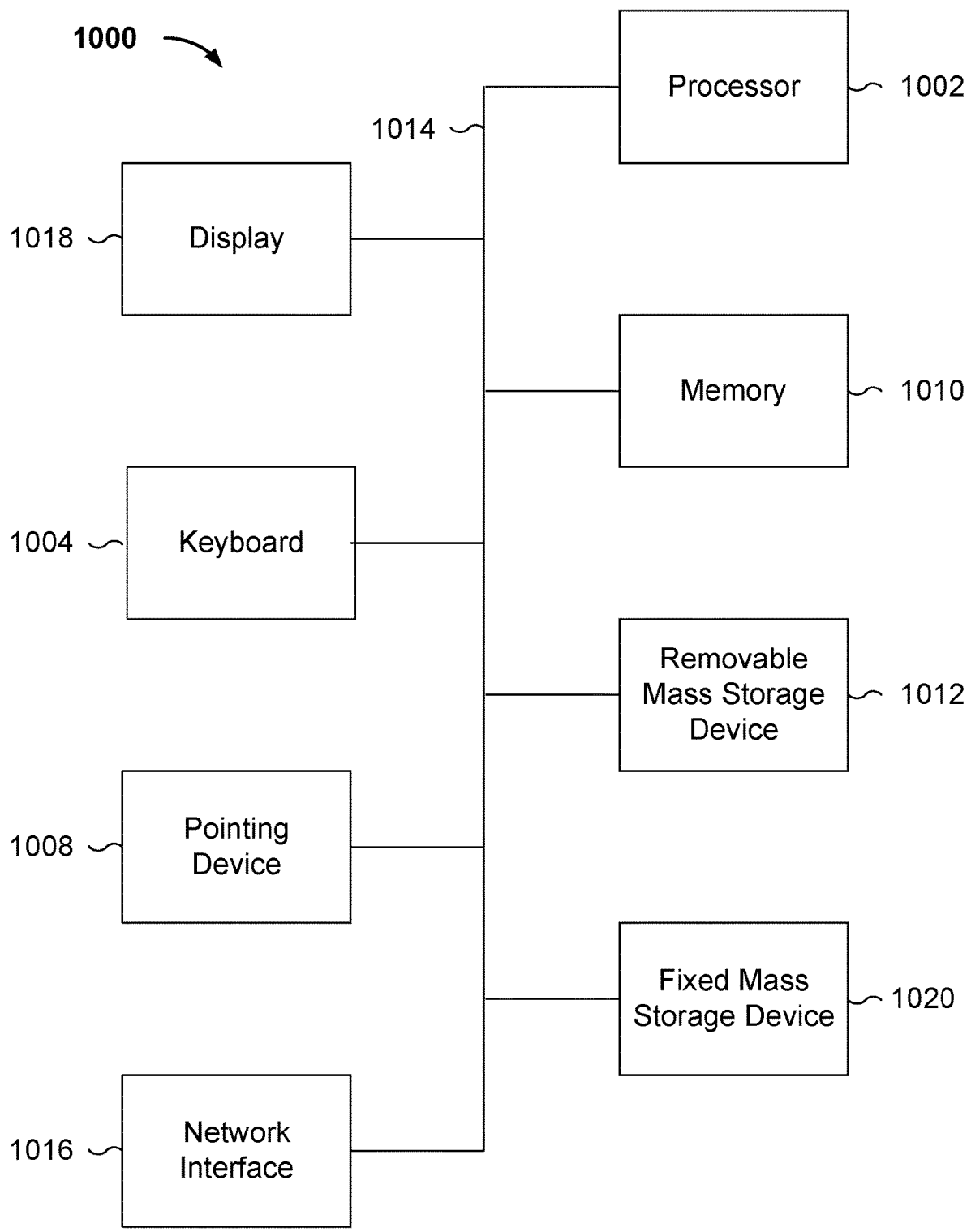
FIG. 10 is a functional diagram illustrating an embodiment of a programmed computer system for extracting and processing application verification information.

FIG. 10 is a functional diagram illustrating an embodiment of a programmed computer system for extracting and processing application verification information. As will be apparent, other computer system architectures and configurations can be used to extract and process application verification information. Computer system 1000, which includes various subsystems as described below, includes at least one microprocessor subsystem (also referred to as a processor or a central processing unit (CPU)) 1002. For example, processor 1002 can be implemented by a single-chip processor or by multiple processors. In some embodiments, processor 1002 is a general purpose digital processor that controls the operation of the computer system 1000. Using instructions retrieved from memory 1010, the processor 1002 controls the reception and manipulation of input data, and the output and display of data on output devices (e.g., display 1018).

Processor 1002 is coupled bi-directionally with memory 1010, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1002. Also as is well known in the art, primary storage typically includes basic operating instructions, program code, data, and objects used by the processor 1002 to perform its functions (e.g., programmed instructions). For example, memory 1010 can include any suitable computer readable storage media, described below, depending on whether, for example, data access needs to be bi-directional or uni-directional. For example, processor 1002 can also directly and very rapidly retrieve and store frequently needed data in a cache memory (not shown).

A removable mass storage device 1012 provides additional data storage capacity for the computer system 1000 and is coupled either bi-directionally (read/write) or uni-directionally (read only) to processor 1002. For example, storage 1012 can also include computer readable media such as magnetic tape, flash memory, PC-CARDS, portable mass storage devices, holographic storage devices, and other storage devices. A fixed mass storage 1020 can also, for example, provide additional data storage capacity. The most common example of fixed mass storage 1020 is a hard disk drive. Mass storage 1012, 1020 generally store additional programming instructions, data, and the like that typically are not in active use by the processor 1002. It will be appreciated that the information retained within mass storages 1012 and 1020 can be incorporated, if needed, in standard fashion as part of memory 1010 (e.g., RAM) as virtual memory.

In addition to providing processor 1002 access to storage subsystems, bus 1014 can also be used to provide access to other subsystems and devices. As shown, these can include a display 1018, a network interface 1016, a keyboard 1004, and a pointing device 1008, as well as an auxiliary input/output device interface, a sound card, speakers, and other subsystems as needed. For example, the pointing device 1008 can be a mouse, stylus, track ball, or tablet, and is useful for interacting with a graphical user interface.

The network interface 1016 allows processor 1002 to be coupled to another computer, computer network, or telecommunications network using a network connection as shown. For example, through the network interface 1016, the processor 1002 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1002 can be used to connect the computer system 1000 to an external network and transfer data according to standard protocols. For example, various process embodiments disclosed herein can be executed on processor 1002, or can be performed across a network such as the Internet, intranet networks, or local area networks, in conjunction with a remote processor that shares a portion of the processing. Additional mass storage devices (not shown) can also be connected to processor 1002 through network interface 1016.

An auxiliary I/O device interface (not shown) can be used in conjunction with computer system 1000. The auxiliary I/O device interface can include general and customized interfaces that allow the processor 1002 to send and, more typically, receive data from other devices such as microphones, touch-sensitive displays, transducer card readers, tape readers, voice or handwriting recognizers, biometrics readers, cameras, portable mass storage devices, and other computers.

For example, computer system 1000 may comprise a smart phone or a tablet computer. For example, memory 1010 is configured to store program instructions, and processor 1002, coupled to memory 1010, is configured to read the program instructions stored by memory 1010 and, in response, execute steps described in process 200 of FIG. 2, process 300 of FIG. 3, process 500 of FIG. 5, and process 800 of FIG. 8.

In some embodiments, processor 1002 is for displaying the extracted verification information in the candidate verification code zone in the verification information input interface.

In some embodiments, processor 1002 is configured to display at least one of the following pieces of information in a verification information input interface: expiration time information associated with the verification information and provider information associated with the verification information.

In some embodiments, processor 1002 is configured to populate the extracted verification information that is displayed at the verification information input interface in an input field of the interface in response to a user operation.

As described above, there are certain instances in which it may not be desirable to (continue to) display the extracted verification information such as, for example, when the extracted verification information expires and/or when the input field of the verification information input interface is not empty. As such, in some embodiments, prior to displaying the extracted verification information, processor 1002 first determines whether one or more conditions for displaying the extracted verification information have been met. For example, some conditions may be determined based on information related to the verification information and some other conditions may be determined based on designated context information.

In some embodiments, processor 1002 is configured to determine that an information related to the verification information condition for displaying the extracted verification information has been met when it is determined that the application in which the verification information input interface is opened is the application that is associated with the server that had provided the verification information.

In some embodiments, processor 1002 is configured to determine that an information related to the verification information condition for displaying the extracted verification information has been met when it is determined that the extracted verification information has not yet expired and is therefore still valid.

In some embodiments, processor 1002 is configured to determine that a designated context information condition for displaying the extracted verification information has been met when it is determined that the input field in the verification information input interface is empty.

In some embodiments, processor 1002 is configured to determine that a designated context information condition for displaying the extracted verification information has been met when it is determined that the displayed keyboard interface comprises a numeric keyboard. In some embodiments, processor 1002 is configured to determine that a designated context information condition for displaying the extracted verification information has been met when it is determined that the time interval in between a non-numeric keyboard being displayed and the time at which the verification information message was received at the device is less than a preset value.

In some embodiments, processor 1002 is configured to send the verification information to the server of the application (e.g., in response to a user operation or without user intervention).

In some embodiments, process 1002 is configured to delete the verification information from the input field of the verification information input field at the verification input display interface in the event that no user operation is received within a set length of time since the input field was populated with the extracted information.

Embodiments of extracting and processing verification information is described with reference to flowcharts and/or block diagrams based on methods, devices (systems), and computer program products. Please note that each process and/or block within the flowcharts and/or block diagrams and combinations of processes and/or blocks within the flowcharts and/or block diagrams can be realized by computer commands. These computer program commands can be provided to general-purpose computers, special-purpose computers, embedded processors, or processors of other data-processing devices to give rise to a machine such that the instructions by the computers or by the processors of other programmable data-processing devices give rise to devices used to implement the functions specified in one or more processes in a flowchart and/or in one or more blocks in a block diagram.

These computer program instructions can also be stored in computer-readable memory that can guide computers or other programmable data-processing devices to operate according to specific modes, with the result that the instructions stored in this computer-readable memory give rise to products that include command means. These command means implement the functions specified in one or more processes in a flow chart and/or one or more blocks in a block diagram.

These computer program instructions can also be loaded onto a computer or other programmable data-processing device, with the result that a series of operating steps are executed on a computer or other programmable device so as to give rise to computer processing. In this way, the instructions executed on a computer or other programmable device provide steps for implementing the functions specified by one or more processes in a flow chart and/or one or more blocks in a block diagram.

In a typical configuration, a computer device comprises one or more processors (CPUs), input/output ports, network interfaces, and memory.

Memory may include the following forms in computer-readable media: volatile memory, random access memory (RAM), and/or non-volatile memory, e.g., read-only memory (ROM) or flash RAM. Memory is an example of a computer-readable medium.

Computer-readable media, including permanent and non-permanent and removable and non-removable media, may achieve information storage by any method or technology. The information may be computer-readable instructions, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digital versatile disc (DVD) or other optical storage, magnetic cassettes, magnetic tape or magnetic disc storage, or other magnetic storage equipment or any other non-transmission media that can be used to store information that is accessible to computers. In accordance with the definitions in this document, computer-readable media do not include transitory computer-readable media (transitory media) such as modulated data signals and carrier waves.

Please also note that the term "comprise" or "contain" or any of their variants are to be taken in their non-exclusive sense. Thus, processes, methods, merchandise, or devices that comprise a series of elements not only comprise those elements, but also comprise other elements that have not been explicitly listed or elements that are intrinsic to such processes, methods, merchandise, or devices. In the absence of further limitations, elements that are limited by the phrase "comprises a(n) . . . " do not exclude the existence of additional identical elements in processes, methods, merchandise, or devices that comprise the elements.

A person skilled in the art should understand that embodiments of the present application can be provided as methods, systems, or computer program products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program codes.

The above-stated are merely embodiments of the present application and do not limit the present application. For persons skilled in the art, the present application may have various modifications and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 one or more processors configured to:
  receive a message at a device;
  extract verification information for authenticating a user of an application from the message, including to:
   obtain a sender code associated with the message from the message;
   determine a message template associated with the sender code based at least in part on pre-stored mapping relationships; and
   extract the verification information included in the message based at least in part on comparing the message to the message template;
  present the verification information at a verification information input interface at the device; and
  perform authentication of the user locally at the device using the verification information or send the verification information via the verification information input interface to an authentication server associated with the application to authenticate the user; and
 one or more memories coupled to the one or more processors and configured to provide instructions to the one or more processors.

2. The system of claim 1, wherein to present the verification information at the verification information input interface at the device comprises to present the verification information in a candidate verification code display zone within the verification information input interface.

3. The system of claim 1, wherein to present the verification information at the verification information input interface at the device comprises to present the verification information within an input field at the verification information input interface in response to a user operation.

4. The system of claim 1, wherein prior to presenting the verification information at the verification information input interface at the device, the one or more processors are further configured to:
 extract expiration time information associated with the verification information from the message; and
 determine that the verification information is still valid based at least in part on the expiration time information.

5. The system of claim 1, wherein prior to presenting the verification information at the verification information input interface at the device, the one or more processors are further configured to determine that the verification information input interface is displayed within the application.

6. The system of claim 1, wherein prior to presenting the verification information at the verification information input interface at the device, the one or more processors are further configured to determine that an input field within the verification information input interface is empty.

7. The system of claim 1, wherein prior to presenting the verification information at the verification information input interface at the device, the one or more processors are further configured to determine that a numeric keyboard interface is displayed.

8. The system of claim 1, wherein prior to presenting the verification information at the verification information input interface at the device, the one or more processors are further configured to:
 determine that a non-numeric keyboard interface is displayed; and
 determine that a time interval between a first time at which the message was received at the device and a second time at which the non-numeric keyboard interface is displayed is less than a preset value.

9. The system of claim 1, wherein the one or more processors are configured to update a read status associated with the message.

10. A method, comprising:
 receiving a message at a device;
 extracting verification information for authenticating a user of an application from the message, including:
  obtaining a sender code associated with the message from the message;
  determining a message template associated with the sender code based at least in part on pre-stored mapping relationships; and
  extracting the verification information included in the message based at least in part on comparing the message to the message template;
 presenting the verification information at a verification information input interface at the device; and
 performing authentication of the user locally at the device using the verification information or sending the verification information via the verification information input interface to an authentication server associated with the application to authenticate the user.

11. The method of claim 10, wherein prior to presenting the verification information at the verification information input interface at the device, the method further comprising:
 extracting expiration time information associated with the verification information from the message; and
 determining that the verification information is still valid based at least in part on the expiration time information.

12. The method of claim 10, wherein prior to presenting the verification information at the verification information input interface at the device, the method further comprising determining that the verification information input interface is displayed within the application.

13. The method of claim 10, wherein prior to presenting the verification information at the verification information input interface at the device, the method further comprising determining that an input field within the verification information input interface is empty.

14. The method of claim 10, wherein prior to presenting the verification information at the verification information input interface at the device, the method further comprising determining that a numeric keyboard interface is displayed.

15. The method of claim 10, wherein prior to presenting the verification information at the verification information input interface at the device, the method further comprising:

determining that a non-numeric keyboard interface is displayed; and determining that a time interval between a first time at which the message was received at the device and a second time at which the non-numeric keyboard interface is displayed is less than a preset value.

16. A computer program product, the computer program product being embodied in a non-transitory computer readable storage medium and comprising computer instructions for:

receiving a message at a device;

extracting verification information for authenticating a user of an application from the message, including:

obtaining a sender code associated with the message from the message;

determining a message template associated with the sender code based at least in part on pre-stored mapping relationships; and extracting the verification information included in the message based at least in part on comparing the message to the message template;

presenting the verification information at a verification information input interface at the device; and performing authentication of the user locally at the device using the verification information or sending the verification information via the verification information input interface to an authentication server associated with the application to authenticate the user.

17. A system, comprising:

one or more processors configured to:

receive a message at a device;

extract verification information for authenticating a user of an application from the message, including to:

identify one or more tags associated with corresponding one or more pieces of content in the message; and extract a piece of content comprising the verification information based at least in part on the one or more tags;

present the verification information at a verification information input interface at the device; and perform authentication of the user locally at the device using the verification information or send the verification information via the verification information input interface to an authentication server associated with the application to authenticate the user; and one or more memories coupled to the one or more processors and configured to provide instructions to the one or more processors.

18. A system, comprising:

one or more processors configured to:

receive a message at a device;

extract verification information for authenticating a user of an application from the message;

prior to presenting the verification information at a verification information input interface at the device:

extract expiration time information associated with the verification information from the message; and determine that the verification information is still valid based at least in part on the expiration time information;

present the verification information at the verification information input interface at the device; and perform authentication of the user locally at the device using the verification information or send the verification information via the verification information input interface to an authentication server associated with the application to authenticate the user; and one or more memories coupled to the one or more processors and configured to provide instructions to the one or more processors.

* * * * *